(No Model.)
F. McINTYRE.
PRESERVING MILK.
No. 432,325. Patented July 15, 1890.
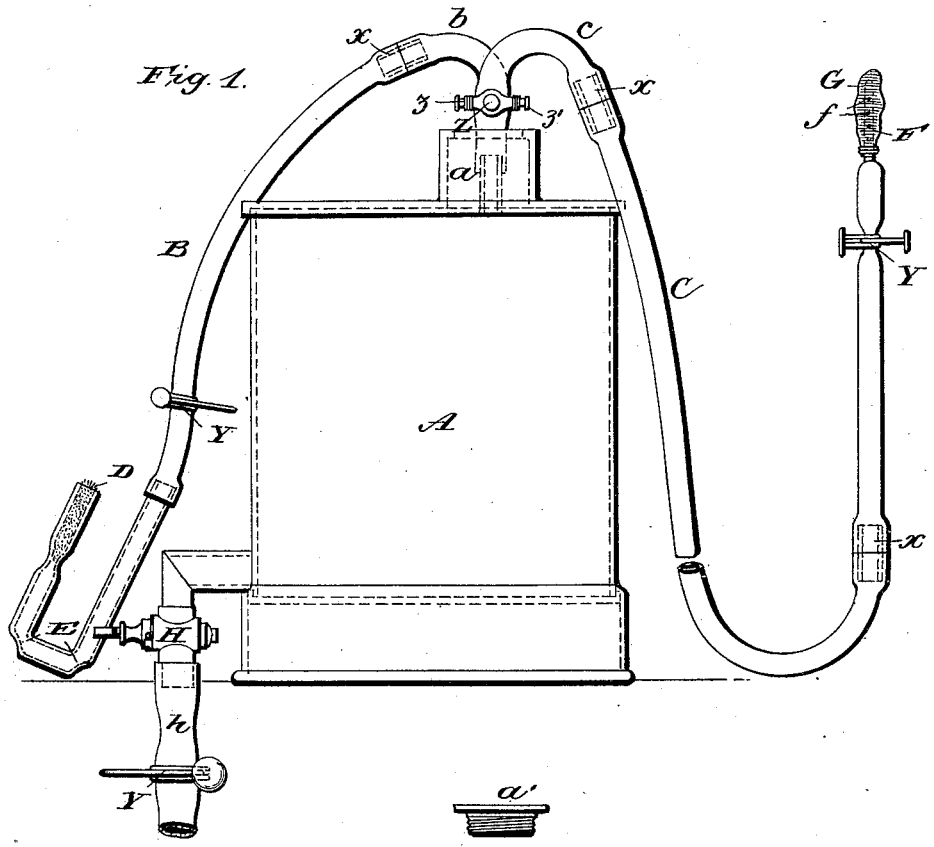
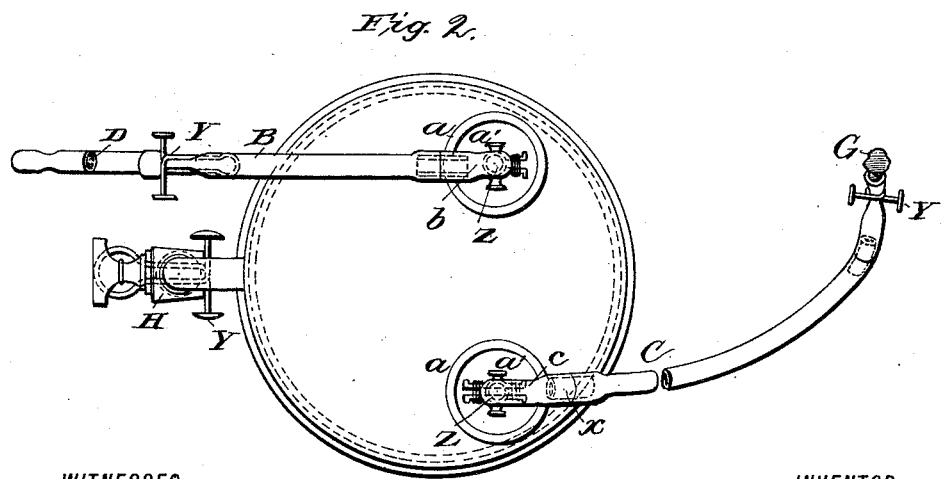
WITNESSES:
L. C. Hills
Ewell B. Dick
INVENTOR
Finlay McIntyre
BY
Marcellus Bailey
ATTORNEY.
THE NORRIS PETERS CO., PHOTO-LITHO., WASHINGTON, D. C.

UNITED STATES PATENT OFFICE.

FINLAY McINTYRE, OF GLASGOW, COUNTY OF LANARK, SCOTLAND.

PRESERVING MILK.

SPECIFICATION forming part of Letters Patent No. 432,325, dated July 15, 1890.

Application filed February 13, 1889. Serial No. 299,792. (No specimens.) Patented in England January 25, 1889, No. 1,423.

*To all whom it may concern:*

Be it known that I, FINLAY MCINTYRE, a subject of the Queen of Great Britain, residing at 310 Argyle Street, Glasgow, and of Mansefield, Busby, both in the county of Lanark, Scotland, have invented an Improved Process for the Preservation of Milk, of which the following is a specification.

This invention relates to an improved process for preserving milk, and has for its object not only to dispense with the introduction into the milk of any antiseptic or preservative substances, but to keep the milk in the same condition as regards purity as it exists in the animal's udder.

It is well known that the cause of milk turning sour or unfit for ordinary use is the existence of germs, ferments, microbes, bacteria, vibrios, molds, and other organic or putrefactive organisms which exist in the air and which grow and become active in an animal fluid or substance exposed to ordinary air. The milk of a cow or other animal, while it is in the milk producing or containing organs of the animal, is entirely free from any germs such as those referred to; and my invention consists in so taking or drawing the milk from the animal into a receiving-vessel or its equivalent that the milk in the said vessel shall be in the same condition as regards purity as it is in the udder of the animal. It is obvious that this result may be attained in practice in a variety of ways. I will, however, describe one apparatus illustrative of my invention, and illustrated in side elevation, Figure 1, and plan, Fig. 2, of the accompanying drawings.

It will be understood that in order to successfully carry out my said invention the receiver A for the milk, with its connections, and the air within the said receiver and its connections must be entirely deprived of the germs and germ seed contained therein. This also can be effected by various methods.

It is well known that steam or heated air or heated water is fatal to germ life. It is therefore a convenient method to use steam, heated air, or heated water in carrying out my invention.

It is obvious that in a single form of a receiver the air, as displaced by the inflowing milk as it comes from the animal, must have a means of escape, and at the same time it is essential, in the carrying out of my invention, that the outer air should not be allowed to enter the receiver, at least in its natural or germ-containing condition. To effect this object, I have an air-tube B or aperture leading from the top of the receiver in addition to the milk-supplying tube C or conduit, the said tube B being for the purpose of filtering the air as it circulates therethrough in the heating and cooling of the receiver by any of the aforesaid agencies. The said filtration of the air is effected by any of the well-known methods of filtering air—for example, a piece of cotton-wool D (preferably moist) is inserted in the air-tube B or its equivalent, or in lieu thereof, or as an addition or independent of the said cotton-wool I may wet the interior of the tube, or a small portion thereof, the outer extremity, for example, with water, or preferably a sticky fluid, such as glycerine; or, in order to cause the germ-laden air to be caught more readily by the wet or glycerined bore of said tube or its equivalent, I form the outer end of the tube with bends or contractions E.

In lieu of steam, hot water, or heated air for cleaning the milk-receiver and its connections prior to taking the milk from the animal, I can use sulphurous-acid gas, carbonic-acid gas, oxygen, or any gases well known to be destructive to germ life, or I may use any of the well-known antiseptics.

The end of the india-rubber tube C (or other convenient air-tight material) opposite the end connected with the receiving-vessel, through which the milk is led direct from the animal into the receiving-vessel, is joined to a smaller metallic tube F, (or other rigid material,) perforated with one or more holes *f*. This smaller metallic tube or its equivalent is covered by elastic or other convenient air-tight material G before the receiving-vessel and connections are purified, in order to prevent air from having access to the receiving-vessel and its connections unless by the filtering air-tube or its equivalent.

When the germ life in the receiver and its connections is destroyed by any of the aforementioned agencies, I insert the small metallic tube into the teat of the animal through the protecting elastic, in order that the milk from the animal may flow through the metallic tube through the india-rubber tubing or other conduit, and thence into the receiving-vessel, the said milk thereby only coming into contact with pure connections, pure vessels, and pure or filtrated air—that is to say, air freed from all organic germs, and vessels and their connections likewise freed from all organic germs.

It is obvious that milk can be so taken from the animal in a variety of ways without inserting a perforated tube into the teats of the animal. For example, I may use a purified elastic cover over the teats of the animal, taking the same precautions to prevent germs from entering, and drawing the milk from the animal by hand in the ordinary way. After the milk is taken from the animal it can be taken from one receptacle or vessel to another, first destroying all germs which such receptacles and their connections contain. When the milk-receiver is filled with the quantity required, it can be disconnected from the animal in any convenient manner. It is only necessary that it be sealed from the external atmosphere, and the same with regard to the air-tube, if desired.

In the drawings I have shown the disconnecting of the tubes effected by the use of pieces of glass tubing $x$, and the closing of the tubes, as required, by metallic spring-clips Y and clamps Z, consisting of two short bars $z$, bound by india-rubber band $z'$, the latter clip being more suitable for use when disconnecting the receiver from the animal; but I may use any other formation of clips as found most convenient.

Receptacle $a$ is provided for the purpose of stowing away the portions $b$ and $c$ of the tubing, together with the clamps Z, when the receiver is disconnected from the animal, screwed covers, such as $a'$, closing the said receptacle $a$.

In order to draw off the milk from the receiver, I employ a stop-cock, such as H, with india-rubber tube $h$ and spring-clips Y.

By my apparatus, as hereinbefore described, the milk as taken from the animal and contained in the receiving-vessel is in the same pure condition as that in which it existed in the udder of the animal, and that, therefore, being entirely void of germ life, the conditions of the pure milk thus obtained remains unimpaired for a length of time that has not been obtainable heretofore, this result being obtained by so taking the milk direct from the animal that the said milk only comes in contact with pure air and pure vessels or receptacles and connections thereof.

Having thus described my invention, what I claim is—

The process herein described of preserving milk, consisting in first purifying the air contained in the receiving-vessel, then taking or drawing the milk from the animal directly into said vessel in such manner as to prevent the atmospheric air from coming in contact with the milk during its passage from the animal into the vessel, as set forth.

In testimony whereof I have signed my name to this specification in the presence of two subscribing witnesses.

FINLAY McINTYRE.

Witnesses:
 JAMES YATE JOHNSON,
 DUNDAS PORTEOUS McKINLAY,
*Both of* 115 *St. Vincent Street, Glasgow.*